Nov. 9, 1965  C. T. LEWIS  3,216,682
CABLE GRIP SUPPORT
Filed Nov. 9, 1964  2 Sheets-Sheet 1
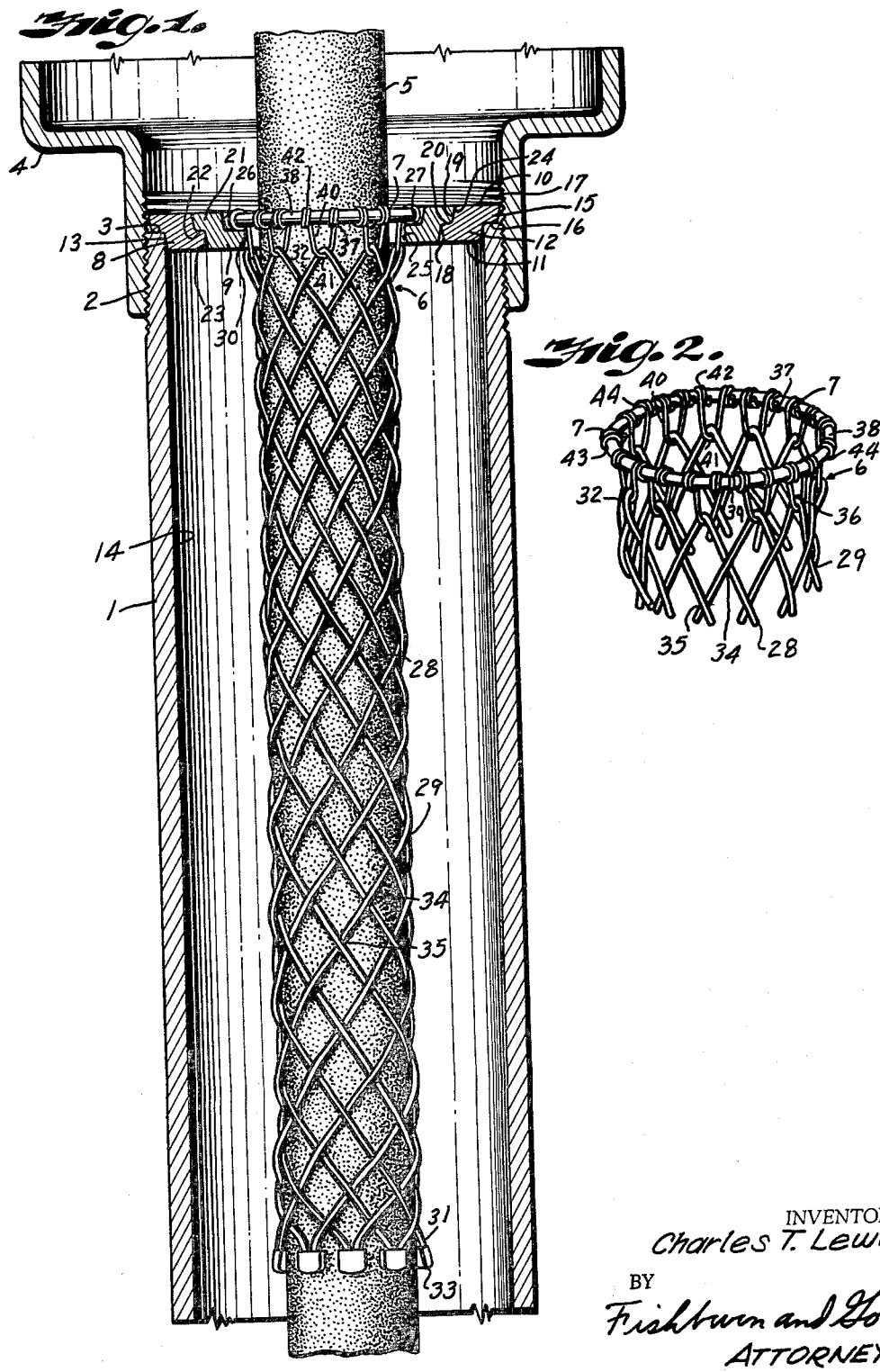
INVENTOR.
Charles T. Lewis
BY
Fishburn and Gold
ATTORNEYS Nov. 9, 1965
C. T. LEWIS
3,216,682
CABLE GRIP SUPPORT
Filed Nov. 9, 1964
2 Sheets-Sheet 2
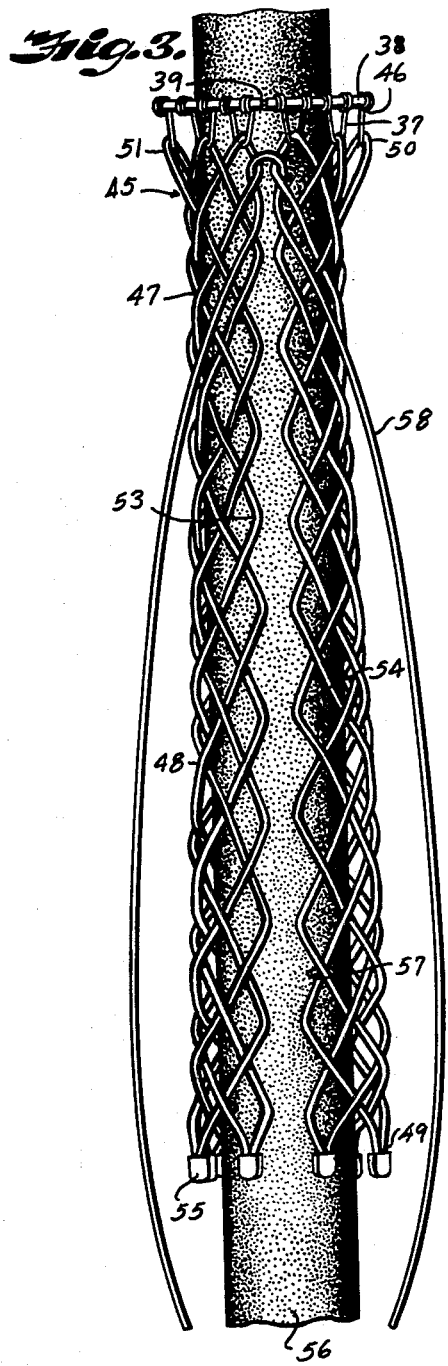
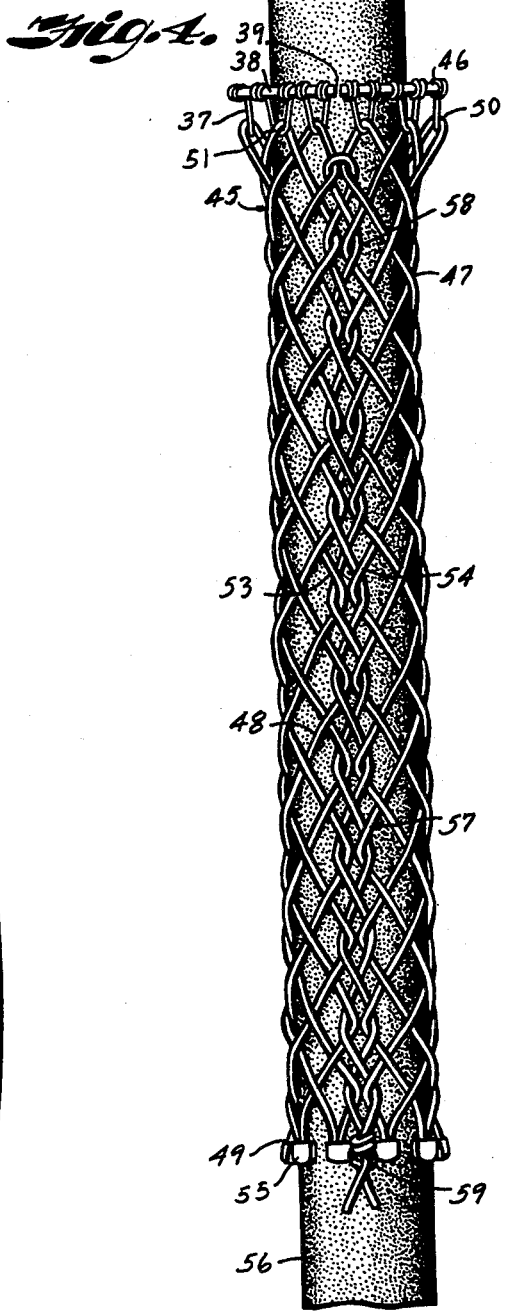
INVENTOR.
Charles T. Lewis
BY
Fishburn and Gold
ATTORNEYS

United States Patent Office 3,216,682
Patented Nov. 9, 1965

3,216,682
CABLE GRIP SUPPORT
Charles T. Lewis, P.O. Box 95089, Oklahoma City, Okla.
Filed Nov. 9, 1964, Ser. No. 409,837
12 Claims. (Cl. 248—60)

This invention relates to cable grip supports, and more particularly to a grip structure and support for vertically disposed portions of cables in conduit risers.

It is common practice in designing building complexes and the like to provide conduits adapted to contain electrical conductors such as cables and the like of a capacity to handle loads that are anticipated due to possible expansion or additional development and, since the time before the large cable may be required is indefinite, adequate capacity cable of much smaller size is installed so as to care for the maximum load that may be required in the near future. When the electrical loads materially increase, the smaller size cables can be pulled from the conduit and larger cables installed. This makes it possible to plan for the future but also avoid the expense and loss that would occur if the large cable were installed when only a small portion thereof is needed. Vertically disposed portions of the conduits are known as conduit risers, and whatever the size of the cable placed therein it should have support for the length of cable contained in the conduit riser.

The principal objects of the present invention are to provide a structure for supporting in depending relation a vertically disposed portion of a cable in a conduit riser without danger of damage to the cable and which can be easily disengaged from the cable when the latter is to be withdrawn from the riser; to provide such a structure with a support ring or head and a tubular body of open mesh strands depending therefrom and adapted to grip a cable extending therethrough; to provide a seat structure adapted to seat on the top of a conduit riser and provide a supporting ledge for the grip head; to provide such a seat structure having a plurality of nested rings seated one in another with each adapted to receive and support a corresponding size grip top ring or head and depending mesh body thereof; to provide such a cable support which may be readily assembled and applied to a cable intermediate its length and arranged at an intermediate point of and/or at the upper end of a conduit riser to support a cable contained therein; to provide such a structure wherein the mesh body is split and the top ring or head open and in applying to a cable the top ring is bent to a curvature surrounding the cable and the edges of the mesh grip secured together along the length thereof by suitable fastening such as lacing or the like; to provide a cable support structure that has a gripping device with a plurality of wire strands spirally interwoven with each other about a common axis to form a tubular open mesh body where the strands extend from the cable receiving end and have their intermediate portions extending through respective U-shaped loops that depend from a head or ring member and then return to the cable receiving end with the ends of the strands secured together; and to provide a cable supporting structure that is economical to manufacture, easily applied, and is efficient in supporting a cable in a conduit riser without injury to the cable.

Other objects and advantages of this invention will become apparent from the following description taken in connection with the accompanying drawings wherein are set forth by way of illustration and example certain embodiments of this invention.

FIG. 1 is a vertical sectional view of a portion of a conduit riser showing a length of cable therein supported in accordance with the invention.

FIG. 2 is a partial perspective view of the upper end of the cable support grip.

FIG. 3 is a side elevation of a modified form of grip partially applied around a cable.

FIG. 4 is a side elevation of said modified form of grip around a length of cable with the edges of the grip body secured together.

Referring more in detail to the drawings:

The reference numeral 1 designates an upper end portion of a standard type of conduit riser which is illustrated as having external screw threads 2 extending from the upper end edge 3 with a fitting 4 screwed onto the upper end of said riser. The fitting 4 may be any conventional conduit fitting such as an entrance cap or box, coupling or the like. A length of cable 5 extends in the conduit riser and a suitable cable grip structure 6 is engaged with said cable and suitably mounted in the riser to support said cable. The grip 6 is of a structure as later described for gripping the respective cable size, there being different size grips to accommodate different size cables. With a maximum size of cable that could be accommodated in the riser 1, an annular support member or head 7 at the upper end of the grip would seat on the upper end edge 3 of the riser 1. When the service does not require the maximum size of cable, smaller capacity cables are used.

In the structure illustrated in FIG. 1, a smaller capacity cable 5 is engaged by a grip 6 and suitable adapter seat rings 8 and 9 are interposed between the annular head member 7 of the grip and the supporting edge 3 of the riser 1 to center the cable 5 relative the riser. The support or seat rings 8 and 9 are of similar structure with the inner and outer peripheral shapes and sizes being such that the smaller one 9 will nest or seat in the next larger one 8 and each is adapted to support a respective size grip 6. The seat ring member 8 has top and bottom surfaces 10 and 11 respectively and the central portion 12 of said ring has a major thickness with the outer periphery thereof 13 being less than the inside diameter of the conduit riser 1 to fit therein with only small clearance between the peripheral surface 13 and the inner surface 14 of said riser. The seat ring 8 has an outwardly extending peripheral flange 15 that is integral with the greater thickness portion 12 and that is spaced upwardly from the bottom surface 11 to present a downwardly facing shoulder 16 adapted to seat on the top end edge 3 of the conduit riser 1, the outer periphery of the flange 15 being less in diameter than the inner diameter 17 of the portion of the fitting 4 that extends upwardly from the upper end of the riser 1. The seat ring 8 has an axial bore 18 and an axial recess 19 opening from the top surface 10 to define an upwardly facing shoulder or ledge 20 adjacent the inner periphery of the seat ring. The bore 18, recess 19 and ledge 20 are of such size and shape to receive the next smaller size of grip than the maximum size grip that could be received in the conduit riser, the grip accommodated by the seat ring 8 being such that its annular head member 7 would seat on the ledge 20.

In the structure illustrated, a second seat ring 9 is positioned in the seat ring 8. If the riser 1 were of smaller size, the seat ring 9 would seat therein in the same manner as the seat ring 8 is seated in the riser illustrated. The seat ring 9 has an outwardly extending peripheral flange 21 with a downwardly facing shoulder 22 of suitable size whereby the periphery 23 of the thick portion of the ring member 9 will fit within the bore 18 with the shoulder 22 seating on the ledge 20 and the outer periphery 24 of the flange 21 fitting within the recess 19 of the ring member 8, as illustrated in FIG. 1. The seat ring member 9 has an axial bore 25 and an axial upper recess 26 defining an upwardly facing shoulder or ledge 27 on which is seated an annular head member 7 of the grip 6 that engages the cable 5 in the riser, the structure of the annular head member 7 of the grip being such that strands 28 of a tubular open mesh body 29 of the grip, as well as the cable 5, are maintained in spaced relation to the inner peripheral portion 30 of the seat ring 9.

The grip 6, in the structure illustrated in FIGS. 1 and 2, has a tubular open mesh body 29 formed of a plurality of wire strands 28 spirally interwoven with each other about a common axis. The body 29 has a cable receiving or lower end 31 through which a cable is adapted to be inserted to be positioned within the body 29. The body portion 29 has a draft end 32 connected to a supporting head or annular structure 7. In the structure illustrated, the strands 28 extends continuously from the lower end 31 to the draft end 32 and then return to the lower end 31 where they are suitably joined together by connectors 33 such as metal members crimped thereon, soldered or otherwise suitably secured thereto.

It is preferred that each of the strands 28 consist of wire or wire cord, as for example what is commonly referred to as aircraft steel strand cable, that is of high tensile strength with substantial flexibility or bendability. It is also preferred that the strands have a suitable coating of plastic material such as polyethylene, polyvinylchloride or the like. As shown in FIG. 1, the strands 28 are woven over and then under as at 34 and 35 respectively in a basketweave generally spirally to form the tubular mesh body portion 29. At the draft end 32, the intermediate portion 36 of the strands at the return bend thereof each extend through a respective opening such as a loop or eye 37 of the head 7. The loops or eyes 37 are in fixed circumferential spacing on said head to maintain the strands of the body equally spaced and supported at the draft end.

In the structure illustrated, the head 7 includes a ring-like portion 38 in the form of a rod or wire bent or formed into a circular shape with the ends 39 substantially engaged to substantially form a circle. In the illustrated structure, the eyes or loop members 37 depend from the ring portion 38 with each having spaced legs 40 connected at their lower ends by a bight 41, the upper ends of said legs terminating in portions 42 adapted to be sleeved over the ring portion 38 and moved thereon to substantially equally spaced relation circumferentially thereof. In the illustrated structure, the upper end portions 42 of the legs are each wound in a closed coil of approximately two convolutions with an inner diameter or opening 43 therethrough such that they are slidable onto the ring portion 38. Each of the loop members 37 in suitably spaced relation are fixed to the ring portion 38 as by soldering as at 44, with the coils or portions 42 so arranged that the legs 40 extend downwardly from the inside periphery of the ring portion 38 and said legs preferably have a length such that the bight 41 is below the lower face 11 of the seat rings 8 and 9 so that the return bend 36 at the top of the strands 28 and extending through said loops is held out of contact with the seat ring portion 30.

In using a gripping device and cable supporting structure constructed as described, the desired size of cable 5 is moved into the conduit 1 and then suitable seat rings 8 and 9 are sleeved over the cable, the number of such seat rings being such that the smallest will nest in the others and accommodate the respective cable size, the outer or larger seat ring 8 being arranged whereby its shoulder 16 rests on the conduit upper edge 3. The body 29 of the grip member 6 is then compressed longitudinally to increase its diameter whereby it can be sleeved over the cable 5 with the end 31 lowermost. It is then moved on the cable to extend the body 29 through the bore 25 of the small seat ring 9 until the head 7 is adjacent the recess in said inner seat ring 9. The body 29 is then released to allow it to lengthen and thereby contract its diameter whereby said body will engage the cable 5. Then, as the weight of the cable provides an endwise pull on the body 29, it causes the ring portion 38 of the head 7 to engage on the ledge 27 of the seat ring and then the force exerted upon the open mesh structure tending to elongate the body causes the strands thereof to engage and tighten upon the exterior surface of the cable to firmly secure the cable against slippage. The engagement of the head 7 with the support or seat rings maintains the cable substantially centered relative to the conduit riser 1 to thereby support the cable without danger of damage thereto. When it is desired to remove the cable or the grip, it is only necessary to compress the open mesh of the body longitudinally and it may then be readily slipped upwardly on the cable.

In the form of the invention illustrated in FIGS. 3 and 4, the grip member 45 has a head 46 that is substantially the same structure as the head 7 in the grip illustrated in FIGS. 1 and 2, wherein the ring portion 38 is a wire or rod member formed into a circle with the ends 39 substantially abutting and loop member 37 mounted thereon and secured in substantially equal circumferential spaced relation. The grip body 47 is composed of a plurality of interlaced strands 48. Each of the strands extend from a lower or cable receiving end 49 continuously to the draft end 50 where they extend through a respective loop or eye 37 of the head 46 and then return to the lower end 49. As shown in the drawings, FIGS. 3 and 4, the body member 47 is not woven in a continuous tubular form, it may be woven substantially flat and then curved to a generally cylindrical shape or substantially tubular body that is split longitudinally thereof. In the body, each of the strands 48 are bent or folded substantially midway their ends to form the respective return or loop 51 at the draft end 50 where they extend through the loop of the members 37 on the head 46. The two sides or sections of each piece of strand extend from their bend or loop 51 through the body portion of the grip and toward the other end 49 in a zigzag fashion to form a series of side loops 53 and 54. The zigzag sections of wire of the body portion 47 of the grip are interwoven in spaced relation to form an open mesh structure and are so arranged with respect to the longitudinal axis of the grip that when such body portion is bent into tubular form the loops 53 and 54 at the adjacent edges may be engaged or secured together. The free ends of the strands 48 at the lower end 49 are connected by connectors 55, such as metal members crimped thereon. The strands form substantially continuous helices throughout the body so that when compressed longitudinally the body 47 with the connected edges will enlarge whereby it can be sleeved onto a cable 56 and when force is applied tending to elongate the body it will contract radially to grip the cable.

With a grip structure constructed substantially as described, in applying same to a cable 56 of suitable size and with the ring portion 38 of the head opened to space the ends 39 thereof apart sufficiently to be moved over a cable, the grip and head are moved to a cable and the open ends of the head moved transversely over the cable to position the cable therein. The ring portion 38 is then bent to substantially circular form whereby the ends 39 are substantially abutting. The side edges 57 of the body are then substantially brought together as illustrated in FIG. 3, and the loops 53 and 54 thereof suitably secured together, as for example by a lace member 58. It is preferred that the lace member be a strand substantially the same as the strands 48 and that it be bent intermediate its ends and the ends extended through the uppermost loops at the side edges of the body, and then the lace member is laced through the loops continuously down the length of the body to the lower end and then tied as at 59. This completes the assembly of the grip and head onto the cable so that when force is applied at the head tending to move the grip upwardly, the weight of the cable gripped by the body will tend to lengthen the body and increase the gripping force by which the strands grip the body. The head may then be seated in seat rings or the like to support the cable in conduit risers.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A structure for supporting in depending relation a vertically disposed portion of a cable on top of a conduit riser comprising,
   (a) a seat ring having a downwardly facing shoulder adapted to seat on the top end of said conduit riser, said seat ring having an axial bore and an axial recess in the upper portion defining an upwardly facing ledge at the inner periphery thereof,
   (b) a cable gripping device having a plurality of wire strands spirally interwoven with each other and defining a tubular open mesh body adapted to surround a cable to be supported, said tubular open mesh body having a draft end, said strands forming loops at the draft end of said body,
   (c) a head member at the draft end of said mesh body, said head member having an annular portion in the form of a circle having an inner periphery greater in diameter than a cable to be supported, said annular portion seating on the ledge of said seat ring,
   (d) and a plurality of members having supporting means depending from said annular portion adjacent the inner periphery thereof and substantially equally circumferentially spaced around the circle of said annular portion,
   (e) the loops of said strands of the mesh body portion at the draft end engaging said supporting means of said depending members to secure said body to said head.

2. A cable support structure as set forth in claim 1 wherein the head annular member is a split ring and the mesh body has a side opening longitudinally for the length thereof aligned with the split of said ring so that the head and body may be opened and moved to position a cable therein and the head member closed thereabout, and means securing the body together at said side opening in surrounding gripping relation to a cable positioned therein.

3. A cable support structure as set forth in claim 1 wherein the head annular portion is a split ring and the mesh body portion is of a split structure in which the strands form loops at the side edges so that the head may be opened and said head and body portion moved to position a cable therein and the head member closed thereabout, and lace means securing the loops at the side edges of the split body together into a tubular structure of open mesh in surrounding gripping relation to a cable positioned therein.

4. A structure for supporting in depending relation a vertically disposed portion of a cable on top of a conduit riser comprising,
   (a) a seat ring having a downwardly facing shoulder adapted to seat on the top end of said conduit riser, said seat ring having an axial bore and an axial recess in the upper portion defining an upwardly facing ledge at the inner periphery thereof,
   (b) a cable gripping device having a plurality of wire strands spirally interwoven with each other about a common axis to form a tubular open mesh body adapted to surround a cable to be supported, said tubular open mesh body having a draft end, said strands extending continuously from a cable receiving end of said body portion to the draft end and return to said cable receiving end,
   (c) means securing ends of the strands together at said cable receiving end,
   (d) a head member at the draft end of said mesh body, said head member having an annular portion in the form of a circle having an inner periphery greater in diameter than a cable to be supported, said annular portion seating on the ledge of said seat ring,
   (e) a plurality of members depending from said annular member adjacent the inner periphery thereof and substantially equally circumferentially spaced around the circle of said annular portion, said depending members having strand receiving openings therein,
   (f) said strands of the mesh body at the draft end each extending through a respective opening of the depending members of said head to secure the body to said head.

5. A structure for supporting in depending relation a vertically disposed portion of a cable on top of a conduit riser comprising,
   (a) a seat ring having top and bottom surfaces and a diameter less than the inside diameter of a conduit riser to fit therein, an outwardly extending peripheral flange integral with said ring and spaced upwardly from said bottom surface and presenting a downwardly facing shoulder adapted to seat on the top end of said conduit riser, said seat ring having an axial bore and an axial recess in the upper portion defining an upwardly facing ledge at the inner periphery thereof,
   (b) a cable gripping device having a plurality of wire strands spirally interwoven with each other about a common axis to form a tubular open mesh body adapted to surround a cable to be supported, said tubular open mesh body having a draft end, said strands extending continuously from a cable receiving end of said body portion to the draft end and return to said cable receiving end,
   (c) means securing ends of the strands together at said cable receiving end,
   (d) a head member at the draft end of said mesh body, said head member having an annular portion in the form of a circle greater in diameter than a cable to be supported and adapted to seat on the ledge of said seat ring,
   (e) a plurality of loop members depending from said annular portion at the inner periphery thereof and substantially equally circumferentially spaced around the circle of said annular portion,
   (f) intermediate portions of said strands of the mesh body at the draft end extending through said loops of said head to secure said body to said head.

6. A structure for supporting in depending relation a vertically disposed portion of a cable on top of a conduit riser comprising,
   (a) a seat ring having top and bottom surfaces and a diameter less than the inside diameter of a conduit riser to fit therein, an outwardly extending peripheral flange integral with said ring and spaced upwardly from said bottom surface and presenting a downwardly facing shoulder adapted to seat on the top end of said conduit riser, said seat ring having an axial bore and an axial recess in the upper portion defining an upwardly facing ledge at the inner periphery thereof,
   (b) a second seat ring having an outwardly extending peripheral flange presenting a downwardly facing shoulder, said second seat ring nesting in the first named seat ring with the flange of said second seat ring in the recess and the shoulder thereof seated on the ledge of the first-named seat ring, said second seat ring having an axial bore and an axial recess in the upper portion defining an upwardly facing ledge at the inner periphery thereof,
   (c) a cable gripping device having a plurality of wire strands spirally interwoven with each other about a common axis to form a tubular open mesh body adapted to surround a cable to be supported, said tubular open mesh body having a draft end, said strands extending continuously from a cable receiving end of said body portion to the draft end and return to said cable receiving end,
(d) means securing ends of the strands together at said cable receiving end,
(e) a head member at the draft end of said mesh body, said head member having an annular portion in the form of a circle having an inner periphery greater in diameter than a cable to be supported and adapted to seat on the ledge of said second seat ring,
(f) a plurality of loop members depending from said annular portion adjacent the inner periphery thereof and substantially equally circumferentially spaced around the circle of said annular portion,
(g) intermediate portions of said strands of the mesh body at the draft end extending through said loops of said head to secure said body to said head.

7. In a gripping device of the character described,
(a) a plurality of wire strands spirally interwoven with each other about a common axis to form a tubular open mesh body portion adapted to be placed in surrounding gripping relation with an article, said body portion having a draft end,
(b) said strands extending continuously from an article receiving end of said body portion to the draft end and return to said article receiving end,
(c) means securing ends of the strands together at said article receiving end,
(d) a head member at the draft end of said body portion and having a ring portion in the form of a circle,
(e) means depending from the inner peripheral portion of said ring portion and having through radial openings substantially equally spaced circumferentially of said ring portion,
(f) and intermediate portions of said strands at the draft end of the body extending through respective openings in said depending means.

8. A gripping device as set forth in claim 6 wherein the ring portion of said head member is in the form of a split ring with ends substantially abutting.

9. In a gripping device of the character described,
(a) a plurality of wire strands spirally interwoven with each other about a common axis to form a tubular open mesh body portion adapted to be placed in surrounding gripping relation with an article, said body portion having a draft end,
(b) said strands extending continuously from an article receiving end of said body portion to the draft end and return to said article receiving end,
(c) means securing ends of the strands together at said article receiving end,
(d) a head member at the draft end of said body portion and having a split ring in the form of a circle with ends substantially abutting,
(e) a plurality of U-shaped loops depending from the inner peripheral portion of said split ring member and substantially equally spaced circumferentially thereof and secured thereto,
(f) and intermediate portions of said strands at the draft end of the body extending through respective loops on the head member, there being one loop for each strand.

10. A gripping device as set forth in claim 9 wherein the U-shaped loops each have spaced legs terminating in spiral coils sleeved on the split ring member and secured thereto.

11. A gripping device as set forth in claim 9 wherein the open mesh body is split longitudinally with side edges having spaced loops along the length thereof whereby the split ring and body may be opened and moved around an article, and means securing the opposed loops at the side edges of the body together in a tubular open mesh structure adapted to be in surrounding gripping relation with an article therein.

12. A gripping device as set forth in claim 10 wherein the open mesh body is split longitudinally with said edges having spaced loops along the length thereof whereby with the split ring the device may be opened and moved around an article, and a strand means lacing the opposed loops at the side edges of the body together in a tubular open mesh structure adapted to be in surrounding gripping relation with an article therein.

References Cited by the Examiner
UNITED STATES PATENTS

| | | | |
|---|---|---|---|
| 1,886,026 | 11/32 | Kellems | 24—123 |
| 1,994,674 | 3/35 | Van Inwagen | 24—123.5 |
| 2,681,781 | 6/54 | Kellems | 248—60 |

CLAUDE A. LE ROY, *Primary Examiner.*